Patented Mar. 5, 1935

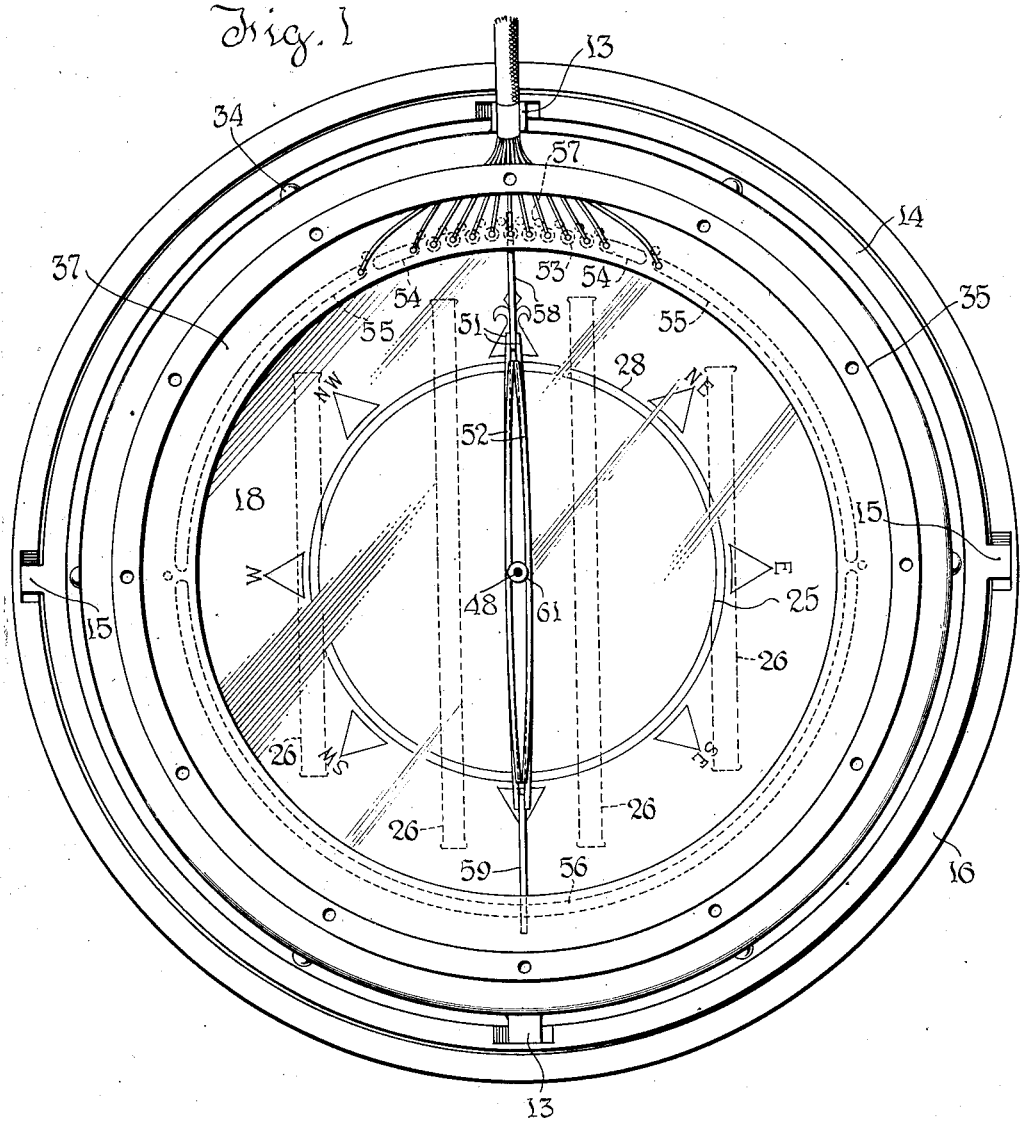

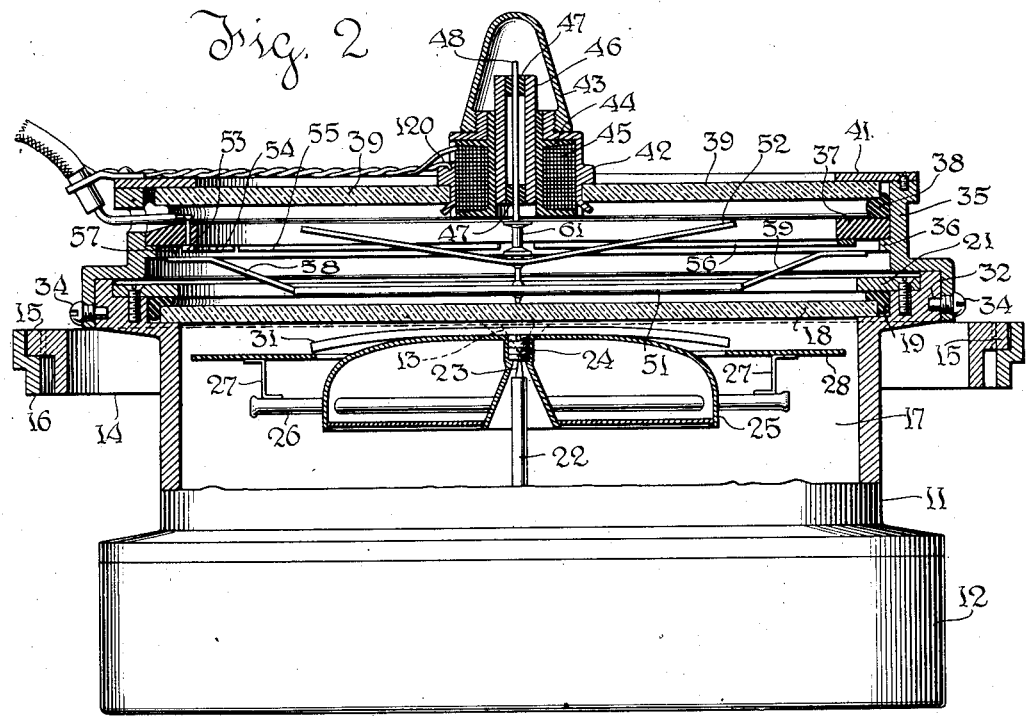
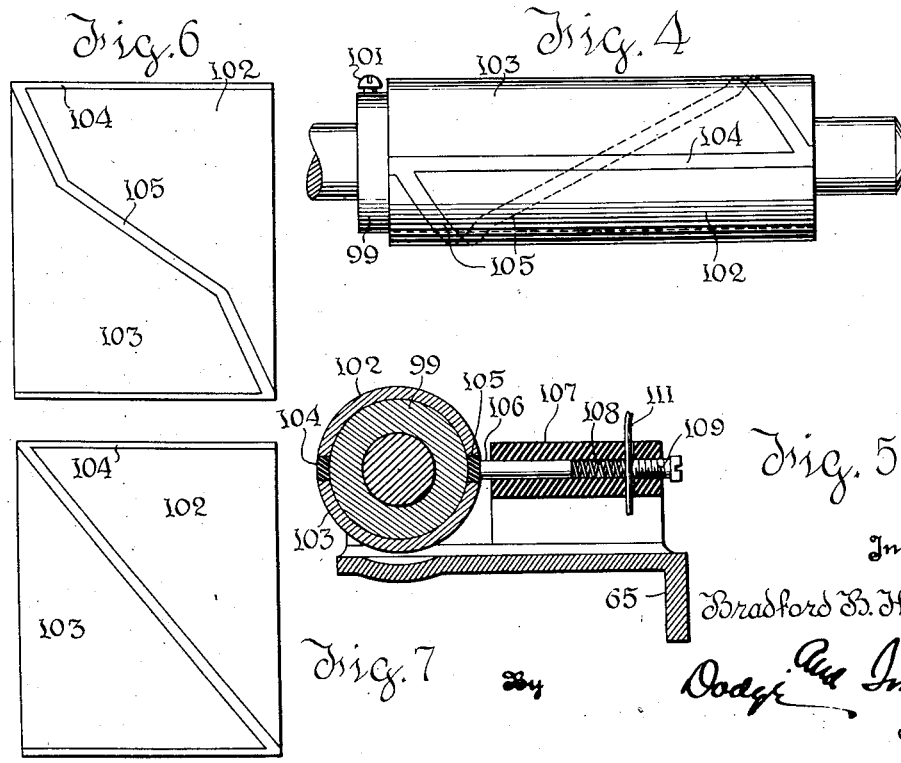

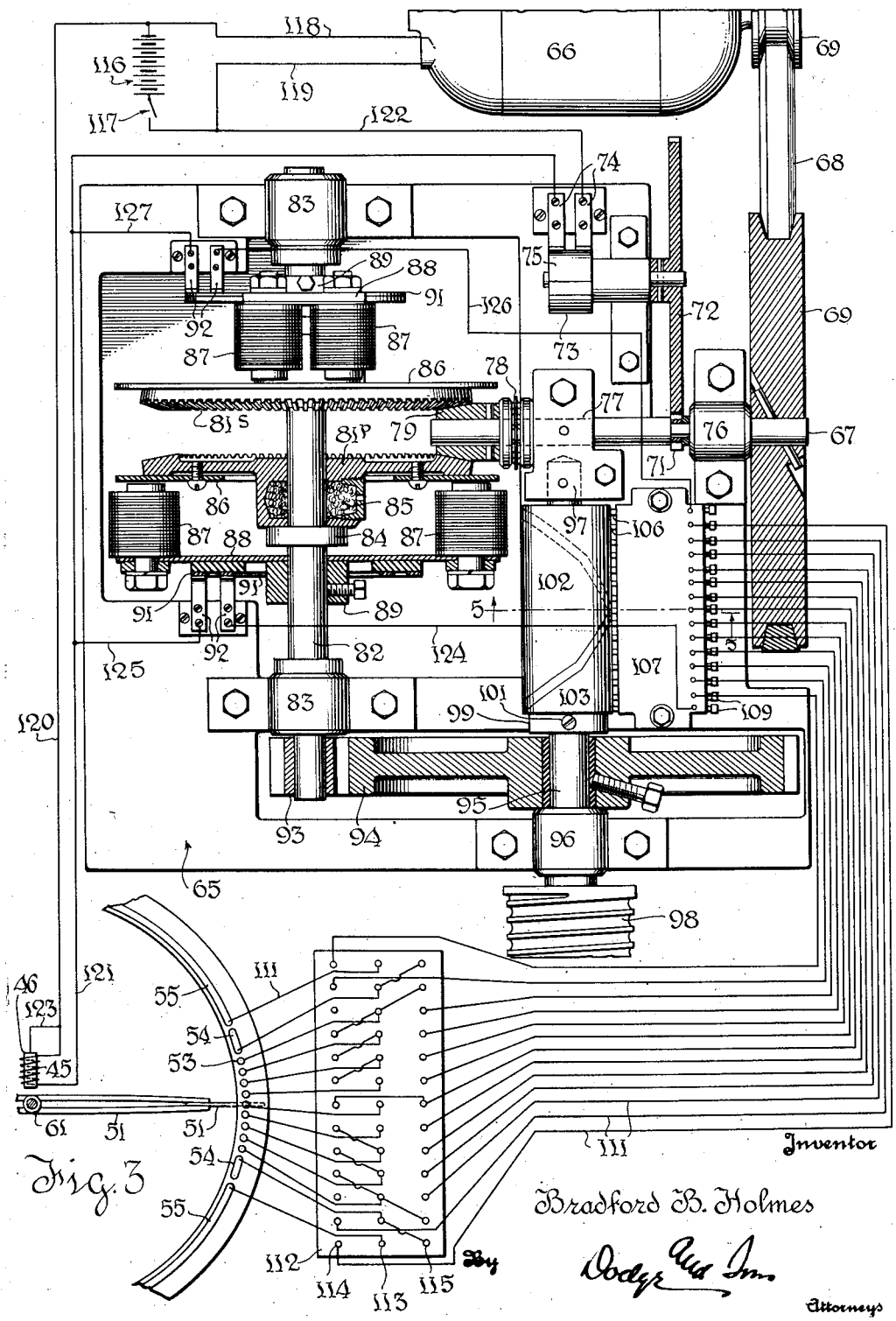

1,993,548

UNITED STATES PATENT OFFICE 1,993,548

METHOD OF AND APPARATUS FOR CONTROLLING BY SENSITIVE INDICATORS

Bradford B. Holmes, Stonington, Conn., assignor to Ruth V. Holmes, Stonington, Conn.

Application December 7, 1929, Serial No. 412,418

18 Claims. (Cl. 33—204)

This invention relates to a method of and means for operating a motor device in accordance with the indications of a sensitive indicating member. It also involves a method of and means for damping the oscillating or other swinging tendencies of such indicating member. Broadly stated, it is immaterial what the indicating member is or exactly what the controlled device is.

Various applications of the inventive concept will readily suggest themselves. For example, the invention may be applied to repeating at a remote point the indications of the sensitive indicating member, such repeating mechanisms, generally stated, being well known. It may control in direction and degree the response of a motor device and this motor device may be located at a point remote from the indicating member.

For purposes of illustration the invention will be described as embodied in a mechanism for steering a boat in accordance with the indications of a magnetic compass. A magnetic compass has been selected because the invention involves the use of certain magnetic forces, and their use in conjunction with a compass, involves some special relations which are of themselves novel. It is not, however, essential that the compass be magnetic, or that the indicating device be a compass, or that the responsive device be a steering mechanism, or that the vehicle steered be a boat. On the contrary, the invention is of the widest application and no limitation to the specific embodiment or field of use is implied, the scope of the invention being defined solely by the appended claims.

The preferred embodiment of the invention in a steering mechanism for boats will now be described in connection with the accompanying drawings, in which—

Fig. 1 is a plan view of a standard Navy compass modified by the addition of the present invention. In this view the parts are shown as they would appear if the retaining ring, cover glass, and shifting magnet carried by the latter, were removed.

Fig. 2 is an elevation, largely in section, of the parts shown in Fig. 1. In this view the cover glass, retaining ring and shifting magnet are in place.

Fig. 3 is a plan view of a steering engine to be controlled by the compass of Figs. 1 and 2. On this view the electric connections are shown in diagram.

Fig. 4 is an elevation of the rotary cylindrical contact forming a part of the follow-up mechanism of the steering engine.

Fig. 5 is a section on the line 5—5 of Fig. 3.

Fig. 6 is a development on a reduced scale of the contact and insulating surfaces on the cylindrical contact shown in Fig. 4.

Fig. 7 is a similar view showing a modified arrangement.

In the drawings, 11 represents the body of the compass which is weighted at its lower portion, as indicated at 12. The body 11 is mounted to oscillate about a geometrical point with the usual gimbals comprising the knife-edge trunnions 13 which engage the seats provided for them on the gimbal ring 14, and the knife-edge trunnions 15 which engage seats provided for them in the fixed supporting ring 16.

The chamber 17 within the compass contains the usual damping liquid which is confined by the cover glass 18. This glass is sealed by a gasket 19 and it and the gasket are retained by the ring 21 which is fastened in place by screws, as shown.

Mounted at the center of the housing 11 is an upstanding pin 22 which carries at its top the pivot 23, the tip of the pivot being coincident with the point about which the compass tilts. Coacting with the pivot 23 is a conical bearing formed in a screw 24. This is threaded into a sleeve which extends axially through the hollow float 25. The purpose of the float is to sustain the compass card and the needles and thus reduce the load on the pivot 23. There are four tubes 26 which contain the magnetic needles used to give the compass its directional characteristic. Four of these are shown, two of which are longer than the other two and pass through the hollow float 25. The shorter two are substantially tangent to the sides of the float, all four needle tubes being parallel with each other. It will be understood that the tubes make tight joints with the walls of the float so that the float is liquid tight.

Supported on the needle tubes 26 by means of brackets 27 is the annular compass card 28 bearing any desired indicia. Familiar markings have been sketched in Fig. 1.

The mechanism so far described conforms in details with standard practice, the compass chosen for illustration being one adopted as standard by the U. S. Navy. The invention can be applied without modifying the compass at all, but I prefer to add to the compass one additional bar magnet which is parallel with the tubes 26 and which is mounted on the top of the float 25 so as to be as near as possible to the cover glass 18. This magnet appears at 31. Its north seeking end is presented in the same direction as the north seeking ends of the needles in the tubes 26, and it may be regarded merely as an auxiliary magnet acting in concert with the regular needles. From another point of view it may be regarded as a means for creating a magnetic field attached to any indicating device whether that indicating device be magnetic in its characteristics or not. The only other change made in the standard compass is to machine a narrow circumferential groove 32 which receives the unthreaded inwardly projecting ends of screws 34 threaded into the depending encircling flange of a ring frame 35. The frame 35 is thus swiveled on the body 11 of the compass, and may be oriented thereon at will.

The frame 35 is provided with an inwardly projecting shoulder 36 on which rests an annulus 37 of dielectric material, such as a phenolic condensation product of the type known under the trade name of "Bakelite". This ring 37 carries certain contacts hereinafter described. Resting upon it is an annular rubber gasket 38 while upon the gasket there is supported and accurately centered a second cover glass 39. The glass is retained by a ring 41, held in place by screws, as clearly indicated in Fig. 2.

Accurately centered by the glass 39 so as to be coaxial with the pivot 23, is an electro-magnet structure. This comprises an annular housing 42 on which is threaded a removable cap 43. The housing 42 receives and centers a spool structure 44 which carries the winding 45. Fixed in the spool 44 is a tubular core 46 of soft iron. Mounted at the top and bottom of the core 46 are bushings 47 of a phenolic condensation product of the type known under the trade name of "Bakelite", or equivalent dielectric material which accurately guide in rotary and in vertical reciprocatory motions a stem 48. This stem must be accurately concentric with the pivot 23 so that the stem 48 will rotate about the same axis as the compass and so that the field of the electro-magnet will exert no disturbing effect on the permanent magnet system giving the directional characteristic to the compass.

The lower end of the stem 48 rests on the cover glass 18 when the stem is in its lowermost position. At as short a distance above its lower end as is commercially practicable, the stem 48 carries a pair of horizontal magnet needles 51 and a short distance above the magnet needles the stem 48 carries a second pair of similar magnet needles 52. The needles 51 and 52 have practically equal magnetism and the south seeking ends of the needles 52 are immediately above the north seeking ends of the needles 51. The needles thus neutralize each other so far as the earth's field is concerned, and the system made up of the connected needles 51 and 52 and the rotary stem 48 is substantially devoid of any inherent directional characteristic or astatic. It is not, however, devoid of directional characteristic with reference to the compass magnets. The needles 51 are far closer than are the needles 52 to the compass needles in the tubes 26. Consequently, the astatic rotary system made up of the stem 48 and the needles 51 and 52 immediately assumes a position in which the north seeking ends of the needles 51 are directly over the south seeking ends of the compass needles. This effect is very greatly intensified if a supplementary bar magnet 31 be used on the compass, because of the proximity of such magnet to the needles 51.

The intensity of the magnetic field varies inversely in accordance with the square of the distance so that the reaction between the needle 31 and the needles 52 is insignificant as compared with the reaction between the needle 31 and the needles 51. This disparity can be intensified by bending the needles 52 so that their ends extend slightly upward, or by any other arrangement which will increase the distance between the needles 52 and the needle 31.

The ring 37 serves to support and to insulate from each other, a series of contacts making up a sort of commutator, but it must be understood that the details of the number and arrangement of such contacts are subject to the widest variation.

Elements of the control head of the compass which are not specifically claimed herein, are described and claimed in my copending application, Serial No. 641,275, filed November 4, 1932, and entitled Control heads for indicators.

As best illustrated in Fig. 1, there are nine contacts 53, each subtending a relatively small angle of swing of the compass. The middle one of these contacts is the true course contact, and it has been found that four similar contacts on each side of the true course contact are sufficient for all ordinary purposes. Beyond these are a somewhat longer contact 54 and a very much longer contact 55. This arrangement is duplicated at both sides of the series of contacts 53. There is also a dead or unconnected contact 56 which subtends an angle of about 180°, and merely serves as a stop surface.

A series of conical studs are mounted in the angular intervals between successive contacts for the purpose of guiding the contactor into contact with one and only one contact of the series at any given time. These studs appear at 57 (see particularly Fig. 2). The contact element is a resilient wire extension 58 mounted on one end of the needles 51. Preferably the contact 58 is mounted on that end of the needles 51 which tends to overlie the north point on the compass card. A similar resilient wire extension 59 is mounted on the other ends of the needles 51, but as it coacts with the dead contact 56 it performs no electrical function.

When the stem 48 is in its lowest position it rests on the glass 18 and the members 58 and 59 are clear of the ring 37 and contacts supported thereby. When the stem 48 moves upward the contactor 58 engages a selected one of the contacts 53, 54 or 55, and the member 59 engages the dead contact 56. The stem 48 is drawn upward through the excitation of the winding 45 and the reaction of the resulting flux upon a spool-shaped armature 61. The members 58 and 59 tend to arrest the armature before it touches the core 46, but the motive force is sufficient to flex the members 58 and 59 until the armature 61 touches the core 46. This completes the circuit through the selected contact. Upon deenergization of the winding 45 the resilience of the members 58 and 59 insures a quick disengagement of armature 61.

The purpose in using the insulating bushings 47 will now be apparent. It will also be obvious that by swiveling the ring 35 on the body 11 of the compass, it is possible to adjust the device to operate with reference to a definite course. The ring 35 may be graduated on its periphery to indicate the angle.

As will be apparent from an inspection of Figs. 1 and 2, it will be possible to arrange the circuits so that instead of using the core 46 and the armature 61 to close the circuit, the connection made to the core 46 might be made to the dead contact 56, in which case the arm 59 would become an active contact I may mention also that the passage of current through the magnets 51 is theoretically undesirable, because of possible effects on the magnetic compass, but actually the result is negligible in a device proportioned as indicated in the drawings. The adverse effect can be eliminated absolutely by using a separate contactor wire at right angles to the needles of the compass, but this is not necessary.

The compass mechanism above described is intended to control a steering engine which will now be described.

The steering engine is constructed as a unit and is mounted on a base indicated generally at 65. Any suitable source of power may be used, but I prefer an electric motor 66 which drives a shaft 67 at a reduced speed by means of a V-belt 68 running on grooved pulleys 69, as clearly shown in the drawings. The shaft 67 carries a pinion 71 which drives a larger gear 72 to turn a commutator drum 73, with which two brushes 74 contact. As the drum rotates it alternately connects and insulates from each other the two brushes 74, and for this purpose carries a conducting segment 75. This is the switch which controls the energization of the winding 45, and on a small boat of about forty feet length, I have successfully used a commutator turning at about 60 R. P. M. and in which the sector 75 subtended an angle of something over 270°, so that the intervals of excitation of the magnet were something over three times the duration of the periods of deenergization.

The shaft 67 turns in bearings 76, 77, and is equipped with a thrust bearing 78 behind the bevel pinion 79. The pinion 79 drives in reverse directions two bevel gears $81^s$, $81^p$, the subscripts being used to differentiate the gears which turn the boat to starboard and port respectively. These gears are mounted to rotate freely on a shaft 82 which turns in bearings 83. They are confined by collars, one of which appears at 84, and are lubricated by means of chambers 85 filled with oil-soaked absorbent material.

Each gear carries an annulus of soft iron 86, 86, which are parts of magnetic clutches by means of which the gears are selectively locked to the shaft 82. Each clutch is of simple construction and includes two bipolar electric magnets 87 mounted at opposite ends of a flexible plate 88 each of which is fixedly mounted on the shaft 82 by means of a corresponding hub 89. Slip rings 91 and brushes 92 serve as means for conducting current to and from the windings there being one set of slip rings and brushes for each clutch, as is clearly shown in Fig. 3. It will be apparent that the selective excitation of the clutches will cause the shaft 82 to rotate in one or the other direction.

Shaft 82 carries a pinion 93 which meshes with a spur gear 94. This is fast on the shaft 95 which turns in bearings 96, 97, and carries at its end the drum 98 on which the tiller rope winds. It might be connected to operate any steering mechanism.

The shaft 95 carries between the spur gear 94 and the bearing 97 a commutator drum 99 whose construction is shown in greater detail in Fig. 4. This drum is angularly adjustable on the shaft 95 by means of a set screw 101. The face of the drum is made up of two conducting areas of copper, similar in form, one of which appears at 102 and the other at 103. They are separated from each other by a longitudinal strip of insulation 104 and by a spiral strip of insulation 105 which varies in spiral pitch. This variation in pitch is best shown in the development of Fig. 6, in which the spiral pitch at the middle is much quicker than the spiral pitch at the end portions of the insulating strip 105. A constant pitch can, however, be used, as indicated in Fig. 7. The purpose of varying the pitch is to limit the rudder response on the four contacts 53 to either side of the middle or true course contacts, and increase the rudder response to the outside contacts 54 and 55. This result is secured by the relation to a series of brushes 106 which are mounted in a guide block 107 bored to receive them. Each brush 106 is urged outward by a spring 108 and is backed up by a thrust screw 109 which also serves to clamp the end of the conductor wire 111, the wire being inserted through a hole in the block 107.

There is one brush for each of the nine contacts 53. These are the middle brush and the four on either side of it. The next two brushes are connected with the contacts 54 and 55. This leaves one brush at each end and these end brushes are used to place the contacting surfaces 102, 103, respectively, in their circuits, that is to say, one end brush is always in contact with surface 102 and the other with the surface 103. All this is clearly diagrammed in Fig. 3.

Assuming the circuit is closed through any contact 53, 54 or 55, the corresponding brush will be energized. There are three possible conditions for the corresponding brush, namely, that the brush is on the insulating strip 105, or that it is on one of the two conducting surfaces 102, 103. If it is on 102 gear $81^s$ will be clutched to shaft 82 and the shaft will be turned in a direction to bring the strip 105 under the brush, thus interrupting the circuit through the clutch and bringing the parts to rest. If the brush is against the contact 103 the other clutch will be energized and the parts will move in the reverse direction until the brush is insulated by contact with the strip 105. In this way the steering engine responds in direction to the contact selection.

The wires 111 which connect the various brushes with respective contacts might be connected directly to those contacts, but this arrangement would be found satisfactory only in relatively calm weather. In heavy seas, and particularly in heavy following seas, where there is a pronounced tendency to yaw, it is necessary to provide means by which the response of the rudder is accentuated, and, in effect, this is accomplished by connecting certain of the contacts nearest the middle or true course contact with brushes near the ends of the series of brushes, so that the steering motor will turn further before the clutches are deenergized.

For this purpose I interpose in the circuits a plurality of double pole single blade switches connected as shown in Fig. 3. In this figure 112 represents the insulating base, 113 represents the studs to which the switch blades are pivoted, and 114 and 115 represent the two opposed poles. Under normal operation for mild weather all the switch blades are thrown to the right, that is to close against the poles 115 in which the nine contacts 53 are connected seriatim to the middle nine brushes, while the outermost or end contacts 53 are connected to the contacts 54 and 55. If the seas are too heavy for this arrangement one would start by throwing the two switches, one on each side of the true course contact switch, against the poles 114. For heavier and heavier seas additional switches counting outward from the center are thrown against the contacts 114. Various arrangements are possible, but the important point is the interposition between the compass contacts and the brushes of a selective switching mechanism which modifies the relation of the compass contacts to the brushes and thus modifies the motion response of the steering engine to suit this response to existing conditions.

As a source of electric current, there is indicated a battery 116 controlled by a switch 117. There are several parallel circuits fed by this battery. One is by wires 118, 119 through the motor 66. Another circuit leads by the wire 120 to the winding 45 and thence by wire 121 through the brushes 74 and commutator 75 to wire 122 and back to the battery.

In actual construction, referring to Fig. 2, the wire 120 is grounded to the housing of the electromagnet 45 and thus electrically connected with the core 46. This is diagrammatically illustrated in Fig. 3 by the branch connection 123. When the winding 45 is excited the circuit is closed between 46 and the armature 61 through needles 51 and contactor 58 to a selected one of the contacts 53, 54 or 55, and thence via the selected wire 111 to a selected brush 106. This produces contact with conducting surfaces 102, 103, as the case may be.

102 is connected by the end brush 106 and wire 126 with one of the brushes 92 which leads current to the magnetic clutch or gear 81ˢ. The other brush is connected by wire 127 with wire 121. The surface 103 is connected by the other end brush and wire 124 with one of the brushes 92 which supplies current to the magnetic clutch associated with gear 81ᵖ. The other brush 92 is connected by wire 125 with return wire 121.

Since return wire 121 leads through the brushes 74 and the commutator 75, and since this commutator controls the excitation of winding 45, it will be apparent that the circuit through the contacts and brushes will be made when 61 closes against 46 and will be broken at the commutator 75. This relieves the compass contacts of destructive arcing.

What is claimed is,—

1. The method of damping a magnetic compass by means of an electric contactor, which consists in establishing between the contactor and the compass needle a magnetic coupling, and alternately arresting and releasing the contactor by periodic engagement with the contact element at predetermined intervals less than the natural period of oscillation of the needle.

2. The method of damping a magnetic compass by means of an electric contactor movable with respect to a contact element, which consists in establishing a reaction between two magnetic fields, one associated with the contactor and the other with the compass needle, whereby the contactor and needle seek a definite relative position relation, and alternately shifting the contactor in a direction to engage the contact and simultaneously diminish such reaction, and then in a direction to clear said contact and simultaneously intensify such reaction and continuing such alternate shifting at predetermined intervals less than the natural period of oscillation of the needle, as the needle moves.

3. The method of damping the over-swinging tendency of the needle of a magnetic compass which consists in magnetically coupling the needle with a concentrically mounted rotatable member and alternately arresting and freeing said rotatable member periodically at predetermined intervals less than the natural period of oscillation of the needle.

4. The method of damping the over-swinging tendency of a pivoted indicating member, which consists in establishing a magnetic coupling between said member and a concentric rotary member, said coupling being substantially less than the force which moves the indicating member, and alternatively arresting and freeing the rotary member at predetermined intervals less than the natural period of oscillation of the indicating member.

5. The combination with a magnetic compass having a movable needle, of a member including a permanent magnet guided in an adjacent similar path; means for coupling said needle and member magnetically; and automatic means for periodically arresting and releasing said member at predetermined intervals.

6. The combination with a pivoted indicator, of a member pivoted on a concentric axis and shiftable in the direction of such axis; means establishing a magnetic positioning reaction between said indicator and member; a contactor carried by said member; a contact element arranged to be engaged by said contactor when said member is shifted axially in one direction; and automatic means for causing shifting of said member alternatively in opposite axial directions at predetermined recurrent intervals.

7. The combination with a magnetic compass of a magnetic element mounted to rotate freely coaxilly with the moving element of the compass and so located relatively to the compass that magnetic reaction produces an alining tendency between the two elements; a contactor carried by said magnetic element; an arcuate contact element; and automatic means for relatively shifting the contactor and contact to produce alternate engagement and separation between them at predetermined recurrent intervals.

8. The combination with a magnetic compass of a magnetic element rotatable and axially shiftable on an axis concentric with the compass axis, and so located relatively to the compass that magnetic reaction produces an alining tendency between said element and the compass needle; a contactor carried by said magnetic element; a contact element engaged by said contactor when said magnetic element is shifted axially in one direction; and automatic means for causing shifting of said magnetic element axially in alternate directions at predetermined timed intervals.

9. The combination with a magnetic compass of an astatic magnetic element rotatable and axially shiftable on an axis concentric with the compass axis, and so located relatively to the compass that magnetic reaction produces an alining tendency; a contactor carried by said magnetic element; a contact element engaged by said contactor when said magnetic element is shifted axially in one direction; and constantly operating timing means for causing shifting of said magnetic element axially in alternate directions at predetermined intervals.

10. The combination with a magnetic compass, of a member guided in an adjacent similar path to that of the compass needle; means for magnetically coupling said magnetic compass needle and member; and automatic means for periodically arresting and subsequently releasing said member at definitely timed recurrent intervals.

11. The method of damping the over-swinging tendency of a magnetic compass, which consists in subjecting the moving element of the compass intermittently to a motion-retarding magnetic field at predetermined periodic intervals less than the natural period of oscillation of the moving elements.

12. Means for damping the oscillations of the needle of a magnetic compass, comprising the combination with said needle, of a damping element, said element being magnetically coupled with said needle to move in an adjacent similar path to that of said needle and capable of being restrained to damp the movements of the needle; and automatic means intermittently restraining said element against movement at definitely timed intervals.

13. The combination with the needle of a magnetic compass, of a movable astatic magnet system magnetically coupled to said needle so as to normally move therewith; and automatic means for restraining movement of said system at predetermined intervals to exercise a damping action on said needle.

14. The combination with the needle of a magnetic compass, of a movable astatic magnet system magnetically coupled to said needle; and automatic means for intermittently and at predetermined intervals arresting and relasing said magnet system to damp the movements of said needle.

15. The combination with a magnetic compass having a needle, of a fixed abutment; an element magnetically coupled with said needle and capable of movement with said needle, said element being also movable with respect to said abutment; and automatically operating means for bringing said element into frictional engagement with said abutment at predetermined recurrent intervals to arrest the movement of said element with said needle and thereby damp the movement of the needle.

16. The combination with a magnetic compass having a movable needle, of a movable element magnetically coupled to said needle to move with it and capable of axial movement independently of said needle; a stationary element with which said movable element may engage to damp the movements of the needle; and electromagnetic means operating automatically at periodic recurrent intervals for bringing said movable element into engagement with said stationary element.

17. The combination with a magnetic compass having a movable needle, of an electric contactor element magnetically coupled to said needle but capable of axial movement toward and away from said needle; stationary contacts cooperating with said contactor; electromagnetic means for causing axial movement of said contactor to bring it into selective engagement with said contacts; and automatic means for causing periodic energization of said electromagnetic means at predetermined recurrent intervals.

18. The combination with a magnetic compass having a pivoted needle, of a movable element magnetically coupled with said needle to move with the same and capable of independent movement toward and away from said needle; a stationary element with which said movable element may engage to damp the movements of the needle; electromagnetic means for moving said movable element away from said needle and into frictional engagement with said stationary element; and automatic means for causing timed periodic energization and de-energization of said electromagnetic means.

BRADFORD B. HOLMES.

CERTIFICATE OF CORRECTION.

Patent No. 1,993,548.  March 5, 1935.

BRADFORD B. HOLMES.

It is hereby certified that error appears in the printed specification of the above numbered patent requiring correction as follows: Page 4, second column, line 31, claim 6, for "alternatively" read alternately; page 5, first column, line 7, claim 11, for "elements" read element; and line 15, claim 12, after "means" insert the word for; and that the said Letters Patent should be read with these corrections therein that the same may conform to the record of the case in the Patent Office.

Signed and sealed this 9th day of April, A. D. 1935.

(Seal)

Leslie Frazer
Acting Commissioner of Patents.